US007698801B2

(12) United States Patent
Conte

(10) Patent No.: US 7,698,801 B2
(45) Date of Patent: Apr. 20, 2010

(54) WIRE-PROCESSING DEVICE AND METHOD OF OPERATING SUCH A WIRE-PROCESSING DEVICE

(75) Inventor: Alois Conte, Ebikon (CH)

(73) Assignee: Komax Holding AG, Dierikon (CH)

(*) Notice: Subject to any disclaimer, the term of this patent is extended or adjusted under 35 U.S.C. 154(b) by 62 days.

(21) Appl. No.: 11/558,116

(22) Filed: Nov. 9, 2006

(65) Prior Publication Data

US 2007/0101570 A1 May 10, 2007

(30) Foreign Application Priority Data

Nov. 10, 2005 (EP) ................................ 05110576

(51) Int. Cl.
*B23P 23/00* (2006.01)

(52) U.S. Cl. .................... 29/564.4; 29/33 M; 29/564.2; 29/753; 29/755; 29/867; 72/418

(58) Field of Classification Search ........... 29/745–749, 29/751–753, 564.4, 742, 33 M; 81/9.51; 72/19.6, 19.5, 21.4, 17.1, 428; 483/901, 483/60, 65; 140/105
See application file for complete search history.

(56) References Cited

U.S. PATENT DOCUMENTS 3,707,756 A * 1/1973 Wolyn ......................... 29/748
3,771,208 A * 11/1973 Taylor et al. ............... 29/566.3
4,631,823 A * 12/1986 Collier et al. ................ 29/867
4,856,187 A * 8/1989 Blaha .......................... 29/867
4,951,369 A * 8/1990 Verrall ....................... 29/33 M
5,058,260 A * 10/1991 Gloe et al. ................. 29/564.4
5,709,025 A * 1/1998 Wuyts ......................... 29/748
6,363,604 B1 * 4/2002 Sakuma ..................... 29/566.1
6,877,208 B2 * 4/2005 Shirakawa et al. ......... 29/564.2
7,140,215 B2 * 11/2006 Viviroli et al. ............... 72/19.6
7,363,693 B2 * 4/2008 Fischer ...................... 29/564.4

FOREIGN PATENT DOCUMENTS

EP 1 515 403 A2 3/2005

* cited by examiner

*Primary Examiner*—Minh Trinh
(74) *Attorney, Agent, or Firm*—Fraser Clemens Martin & Miller LLC; William J. Clemens

(57) ABSTRACT

In a wire-processing machine, by a linear movement away from a first holding unit, a gripper applies to a gripping unit a pull-out force in the longitudinal axis of the wire. The pull-out force that is exerted on the wire is measured by, for example, a force sensor that is arranged on the holding unit or by the motor current of the motor that causes the linear movement. The gripper and the gripping unit together make measurement of the pull-out force possible also for medium-sized and large wires without the gripper needing to be constructed stronger, or its dimensions, or the gripper-arm drive, needing to be changed.

12 Claims, 7 Drawing Sheets

WIRE-PROCESSING DEVICE AND METHOD OF OPERATING SUCH A WIRE-PROCESSING DEVICE

BACKGROUND OF THE INVENTION

The present invention relates to a wire-processing device with processing stations for processing a wire and a method of operating such a wire-processing device, at least one gripper feeding the wire to the processing stations for the production of a wire-end connector and being usable for inspection of the wire-end connector produced by the processing stations.

Known devices for inspecting a crimped connector consist of a holding device to hold the crimped connector and of a pulling device to apply to the wire crimp a force acting along the longitudinal axis of the wire. The insulation crimp can be manually removed before the crimping operation so that the pull-out force for the wire crimp is not distorted. With the insulation crimp, the pull-out force for the conductor crimp is increased by two to five percent. The inspection device can be operable either manually or by means of a motor, the pulling force that is measured by force sensors being displayed. Should the crimped connector either partially or completely fail to withstand a predefined pull-out force, the wire is rejected by hand.

European patent document EP 1 515 403 A2 shows a wire-processing machine in which a belt-drive feeds a wire to a first swivel-arm with a first gripper. To feed the leading wire-end to processing stations, the first swivel-arm is set in a swiveling motion and/or in a linear motion. To feed the trailing wire-end to processing stations, a second swivel-arm is set in a swiveling motion and/or in a linear motion. A holding device serves to inspect the wire-end connector or crimped connector that is produced in the automated wire-processing process, the linear motion of the gripper also being used for the automated inspection of the wire-end connector.

A disadvantage of this known device is that the gripper closing force for wires with medium-sized and large cross sections is not sufficient for the pull-out force measurement. During the pull-out movement executed by the gripper, the gripper cannot hold or grip the wire sufficiently. Should the wire slip in the gripper, the desired pull-out force cannot be attained. A substantially more strongly built gripper would be able to meet these requirements, but at the cost of the gripper dimensions and at the cost of the gripper mass needing to be moved and the associated larger drive.

SUMMARY OF THE INVENTION

It is here that the present invention sets out to provide a remedy. The invention provides a solution for avoiding the disadvantages of the known device and creating a wire-processing device, and a method for operating such a wire-processing device, by means of which the inspection of a wire-end connector within an automated wire-processing process is possible also for medium-sized and large wires.

In this wire-processing device with processing stations for processing a wire, at least one gripper is provided that feeds the wire to the processing stations for the production of a wire-end connector and that can be used for inspection of the wire-end connector produced by the processing stations, a pull-out device with at least one holding unit and one gripping unit being provided, and the gripper feeding the wire-end connector to the holding unit to be firmly held and exerting on the gripping unit a pull-out force in the longitudinal axis of the wire.

In this method for the operation of a wire-processing device with processing stations for processing a wire, the wire is fed to the processing stations by at least one gripper, the gripper being used for an inspection of the wire-end connector produced by the processing stations, the wire being fed by the gripper to a pull-out device with at least one holding unit and one gripping unit and the gripper exerting on the gripping unit the pull-out force necessary for the inspection, the wire-end connector that is held firmly by the holding unit acting against the pull-out force.

The inspection of the wire-end connector by means of a measurement of the pull-out force is mainly performed when setting up the wire-processing machine, occasionally if necessary also during production. Since the gripping forces that can be generated by means of the grippers or gripper jaws are completely sufficient for all other wire-processing processes, it is advantageous to provide an additional gripping unit that is capable of holding small, medium-sized, and large wires during measurement of the pull-out force. The pull-out movement and the generation of the pull-out force still take place by means of the gripper-arm drive. The pull-out force can be measured from the current of the gripper-arm drive.

The effect of the insulation crimp on the pull-out force of the conductor crimp can be kept negligibly small, in that the insulation behind the crimped connector is cut into by means of the insulation-stripping blade.

Additionally advantageous is that already existing modules of the wire-processing device can be used for inspection of the wire-end connector produced in the automated wire-processing process. In an automated wire-processing process, inter alia grippers arranged on swivel-arms or grippers arranged on transfer devices are used to feed the wire to the processing stations. The gripper is not only moved in the circle or in the transfer direction but also linearly in the longitudinal axis of the swivel-arm or perpendicular to the direction of transfer. The horizontal linear movement or crosswise movement of the gripper extending into the depth of the wire-processing device is necessary, for example, for the feeding of wires to different crimp contacts or for the feeding of wires with bushes, or for the feeding of wires to deeply located processing stations.

In the wire-processing device according to the present invention, the linear movement of the gripper is used not only for feeding the wire to the processing stations but also for the automated inspection of the wire-end connector. The wire-end connector or crimped connector is fed to a holding unit by which it is firmly held. The gripper then lays the wire in a gripping unit that grips the wire firmly. By means of a linear movement away from the holding unit, the gripper then applies to the gripping unit a pull-out force in the longitudinal axis of the wire. Thanks to the linear movement of the gripper that allows multiple use of the gripper, or the gripper to be used for different purposes, the wire-processing device can be constructed more simply and operated more productively and with greater assurance of quality. Gripper and gripping unit together make measurement of pull-out force possible also for medium-sized and large wires without the gripper needing to be constructed more strongly, or its dimensions, or the gripper-arm drive, needing to be changed.

DESCRIPTION OF THE DRAWINGS

The above, as well as other, advantages of the present invention will become readily apparent to those skilled in the art from the following detailed description of a preferred embodiment when considered in the light of the accompanying drawings in which:

FIG. 5 is a view similar to FIG. 4 showing the wire-end laid in;

DESCRIPTION OF THE PREFERRED EMBODIMENT

Figure 1:
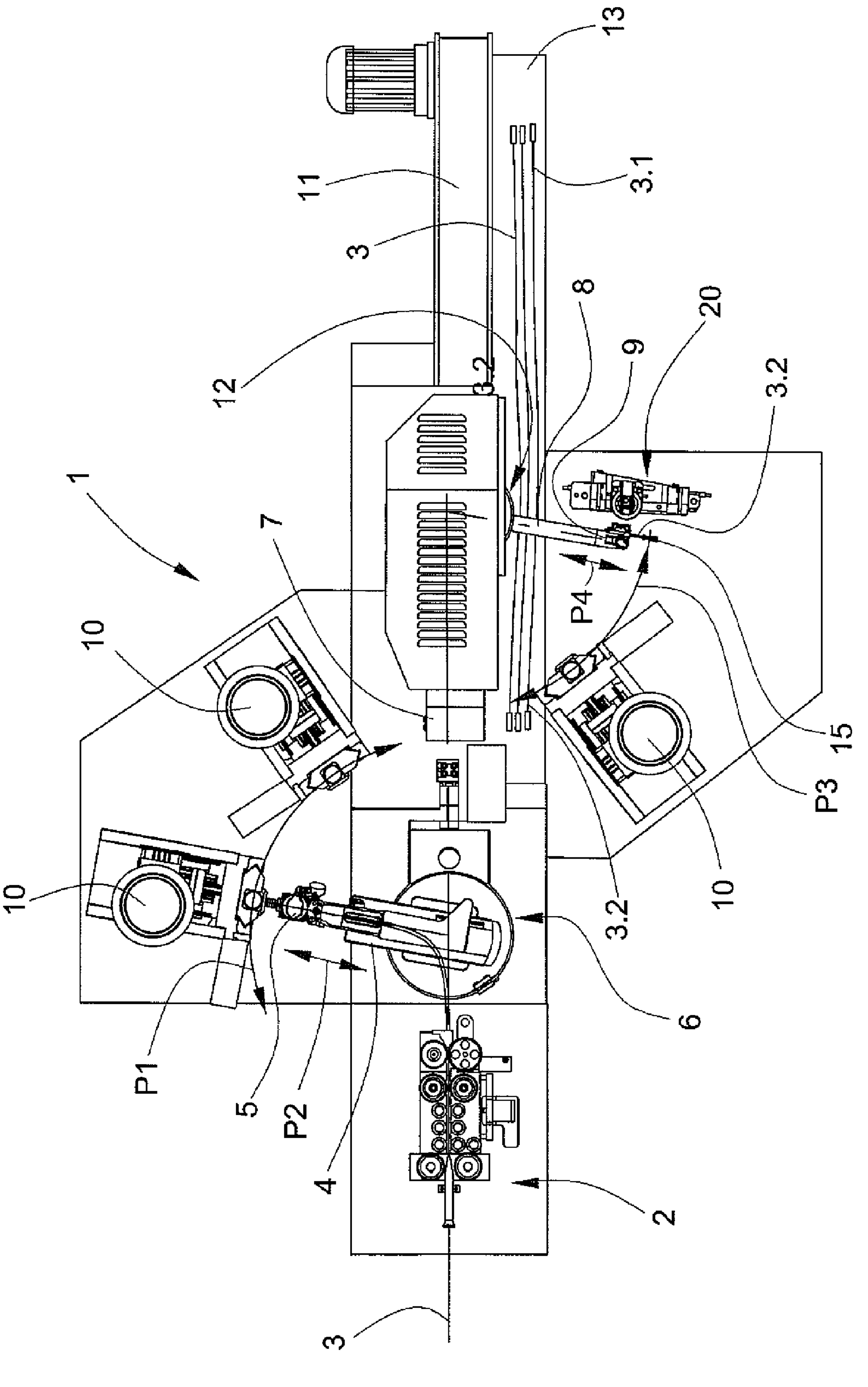
FIG. 1 a plan view of a wire-processing machine with two swivel-arms according to the present invention.

FIG. 1 shows a wire-processing machine 1 with a wire-advancing device in the form of a belt-drive 2, the belt-drive 2 feeding a wire 3 to a first swivel-arm 4 with a first gripper 5. By means of first drives 6, the first swivel-arm 4 can be set in a swivel motion symbolized by an arrow P1 and/or in a linear motion symbolized by an arrow P2. By means of separation/insulation-stripping blades 7, the wire can be separated and/or stripped of insulation. In the insulation-stripping operation, the wire sheath or wire insulation is cut into by means of the stripping blades and the insulation remnant pulled off by means of a pulling-off movement. In a wire destined for pull-off force measurement, an additional cut is made into the wire sheath, the insulation crimp produced in the crimping operation embracing the additional remnant of insulation. When measuring the pull-out force, the additional insulation remnant that is embraced by the insulation crimp slides on the wire conductor.

In addition, the wire-processing machine 1 has a second swivel-arm 8 with a second gripper 9. By means of second drives 12, the second swivel-arm 8 can be set in a swivel motion symbolized by an arrow P3 and/or in a linear motion symbolized by an arrow P4. By means of the turning movement P1 and the linear movement P2, the first swivel-arm 4 as feeding device serves leading wire-ends 3.1 to processing stations 10 (for example crimp presses and/or bush-mounters) arranged to the side of the longitudinal axis of the wire. By means of the turning movement P3 and the linear movement P4, the second swivel-arm 8 that is set in motion by the second drives 12 serves, as a feeding device, trailing wire-ends 3.2 to other processing stations 10 (for example crimp presses and/or bush-mounters) arranged to the side of the longitudinal axis of the wire. After processing of the leading wire-end 3.1, the wire 3 is transported further by means of a transporting belt 11. The second gripper 9 grasps the trailing wire-end 3.2, following which the wire 3 is separated and the trailing wire-end 3.2 stripped of insulation and fed to the other processing stations 10. After processing of the trailing wire-end 3.2, the wire 3 arrives in a tray 13.

Figure 3:
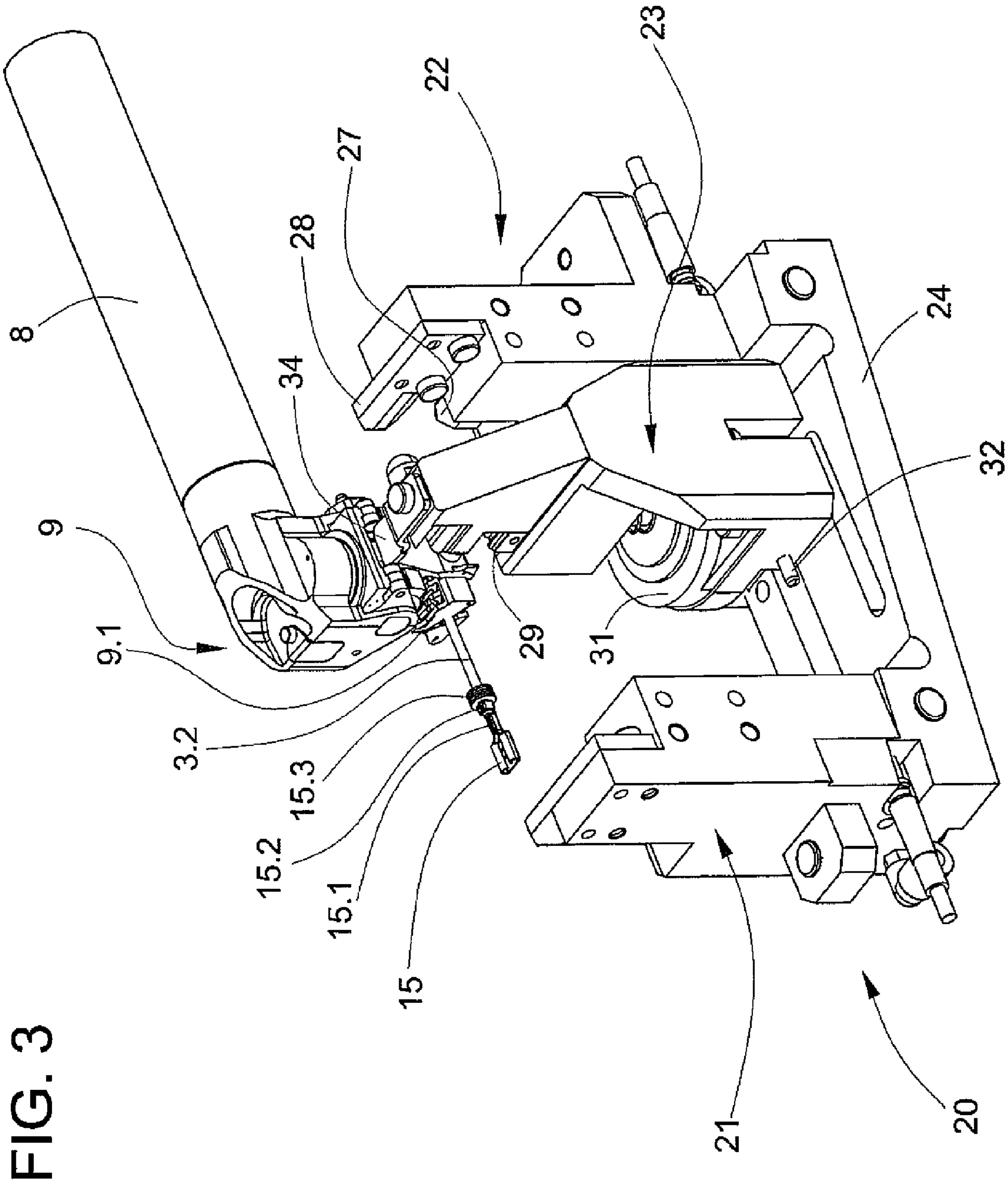
FIG. 3 is a perspective view of a gripper docking onto a gripping unit shown in FIG. 2.

Indicated with 20 is a pull-out device that serves to inspect a wire-end connector 15, hereinafter called the crimped connector 15, that is produced in the automated wire-processing process (for example, the crimp connection between the crimped connector 15 and the wire 3). In a crimped connector, a conductor crimp 15.1 embraces a wire conductor, and an insulation crimp 15.2 embraces the wire insulation, there being possibly placed on the wire insulation a sealing bush 15.3 as shown in FIG. 3. The inspection of other wire-end connectors, as for example soldered connectors, is also possible. The pull-out device 20 is arranged in the swiveling range of the second gripper 9. If it is not necessary to inspect both crimped connectors, the pull-out device 20 can also be arranged in the swiveling range of the first gripper 5. By means of the gripper 9, the wire-end 3.1, 3.2 with the crimped connector 15 is fed to the pull-out device 20, the crimped connector 15 being held firmly by means of a holding unit 21, 22, and the wire-end 3.1, 3.2 being gripped firmly by means of a gripping unit 23. The gripper 9 pushes in the direction of the longitudinal axis of the wire against the gripping unit 23 and, by means of the linear movement P4 (FIG. 1) away from the crimped connector 15, exerts on the wire 3 a pull-out force AK (FIG. 6) in the longitudinal axis of the wire. The pull-out force AK that is exerted on the wire 3 is measured by, for example, at least one force sensor that is arranged on the holding unit 21, 22, or by means of the motor current of the motor that causes the linear movement P4. The control of the wire-processing device defines the pull-out force and captures the measured pull-out force AK for, for example, statistical or controlling purposes.

The gripper 9 that feeds the wire 3 with crimped connector 15 executes the linear movement P4 with limited current. The current limit represents the pull-out force AK. Failure to attain the pull-out force AK, or the current limit, means that the crimped connector did not withstand the required pull-out force AK and the wire crimp 15.1 is faulty. If the pull-out force is measured by means of force sensors, the motor current of the motor that causes the linear movement P4 is increased until the required pull-out force is attained. Failure to attain the required pull-out force AK that is measured by the force sensor means that the crimped connector did not withstand the required pull-out force AK and the wire crimp 15.1 is faulty.

On failure to pass the pull-out test, an error message is issued and the processing device is stopped by the control.

Figure 2:
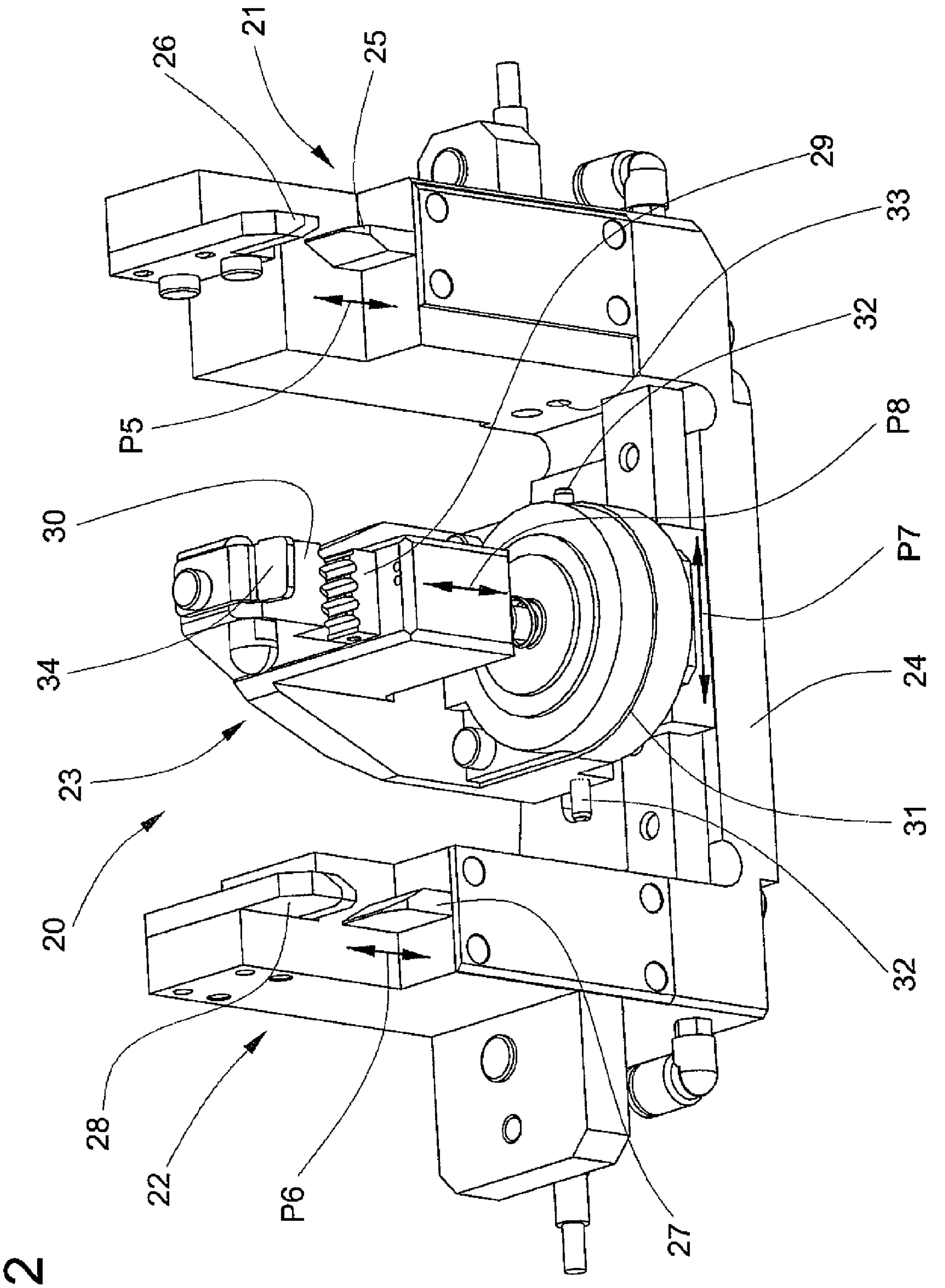
FIG. 2 is a perspective view showing details of a pull-out device of the machine shown in FIG. 1.

FIG. 2 shows details of the pull-out device 20 with the first holding unit 21, the second holding unit 22, and the gripping unit 23. A housing 24 serves as support for the holding units 21, 22 and the gripping unit 23. The first holding unit 21 is provided for inspection of the crimped connection of the trailing wire-end 3.2 and has a first blade 25 and a second blade 26, the first blade 25 being movable in a direction symbolized by an arrow P5. The second blade 26 can also be made in a form that can be fed. While the pull-out force is being measured, the blades 25, 26 hold the crimped connector of the trailing wire-end 3.2 firmly. The second holding unit 22 is provided for measurement of the pull-out force of the crimped connection of the leading wire-end 3.1 and has a first blade 27 and a second blade 28, the first blade 27 being movable in a direction symbolized by an arrow P6. While the pull-out force is being measured, the blades 27, 28 hold the crimped connector of the leading wire-end 3.1 firmly.

The gripping unit 23 is freely movable relative to the housing 24 in a direction symbolized by an arrow P7 and has a first gripping element 29 and second gripping element 30 by means of which the wire-end 3.1, 3.2 can be firmly gripped. The gripping elements 29, 30 can have different gripping surfaces (corrugated surface. V-shaped surface, flat surface, profiled surface, etc.). By means of an actuator 31 (for example by means of a pneumatic cylinder), the first gripping element 29 is movable in a direction symbolized by an arrow P8. The second gripping element 30 can also be feedable. During the inspection, the gripping elements 29, 30 hold the wire-end 3.1, 3.2 firmly.

In one or other end-position of the gripping unit 23, pins 32 penetrate into drilled holes 33 of the housing 24. Arranged in the drilled holes 33 are magnets that hold the pins 32 or gripping unit 23 firmly in the respective end-position. The end-positions are monitored by means of sensors. A docking finger 34 that is arranged on the gripping unit 23 serves to dock the gripper 9 on the gripping unit 23.

FIG. 3 shows the gripper 9 with a trailing wire-end 3.2 when docking onto the gripping unit 23. The gripper 9 knows the end-position of the gripping unit 23 and with the rotating movement P3 docks onto the docking finger 34. After docking, the gripper 9 moves the gripping unit 23 out of the end-position into an intermediate position in which the gripper 9 can lay the crimped corrector 15 in the first holding unit 21 and the trailing wire-end 3.2 between the gripping elements 29, 30 of the gripping unit 23. With the rotating movement P3, the gripper 9 then undocks from the docking finger 34 and with the linear movement P4 moves further in the direction of the blades 25, 26 of the first holding unit 21.

Figure 4:
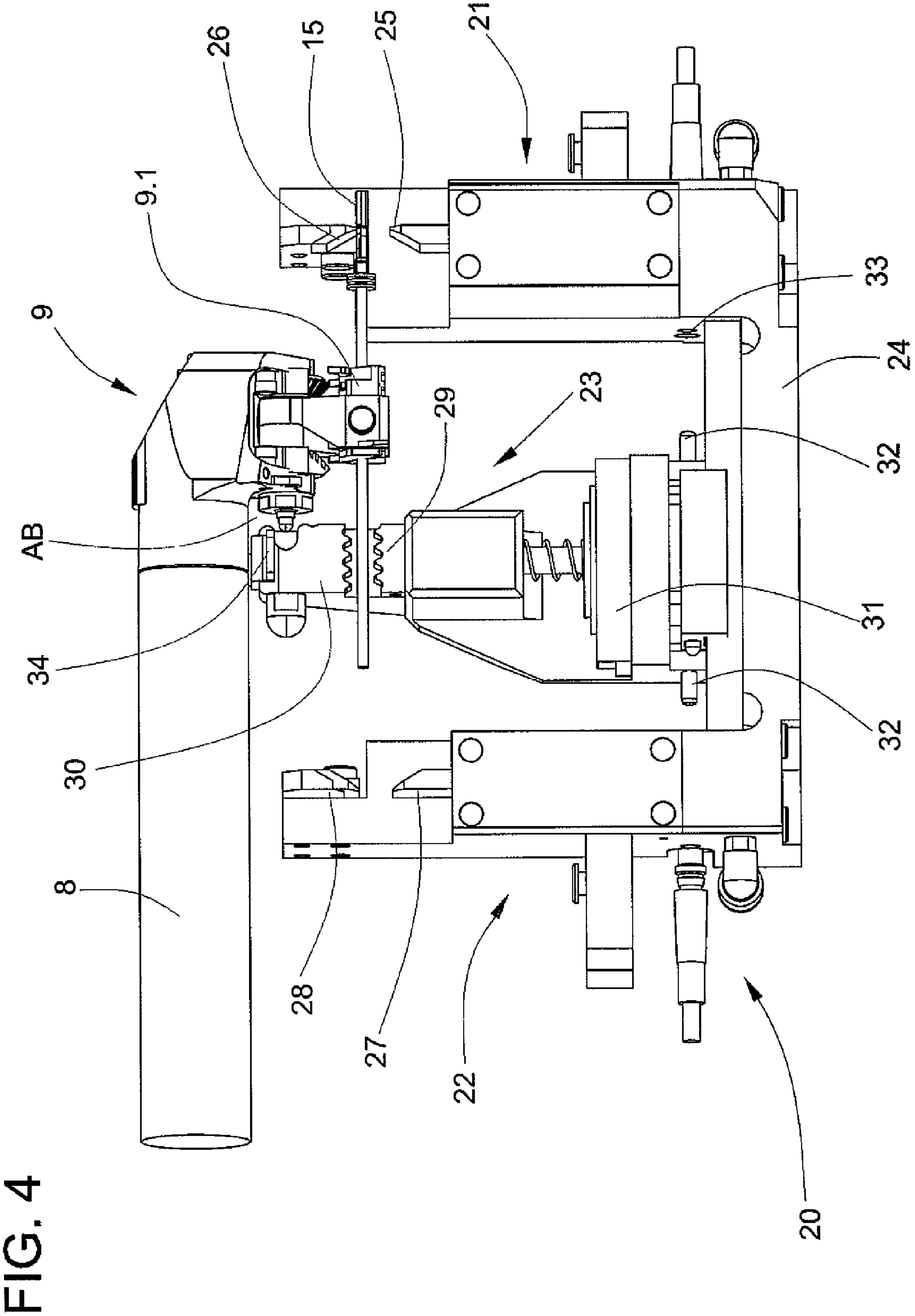
FIG. 4 is an elevation view of the gripper laying a wire-end into the pull-out device shown in FIG. 3.

FIG. 4 shows the gripper 9 inserting the crimped connector 15 into the first holding unit 21 and inserting the trailing wire-end 3.2 into the gripping unit 23. After the linear movement P4, the gripper 9 executes the rotating movement P3 until the crimped connector 15 lies between the blades 25, 26 and the trailing wire-end 3.2 lies between the gripping elements 29, 30.

Figure 5:
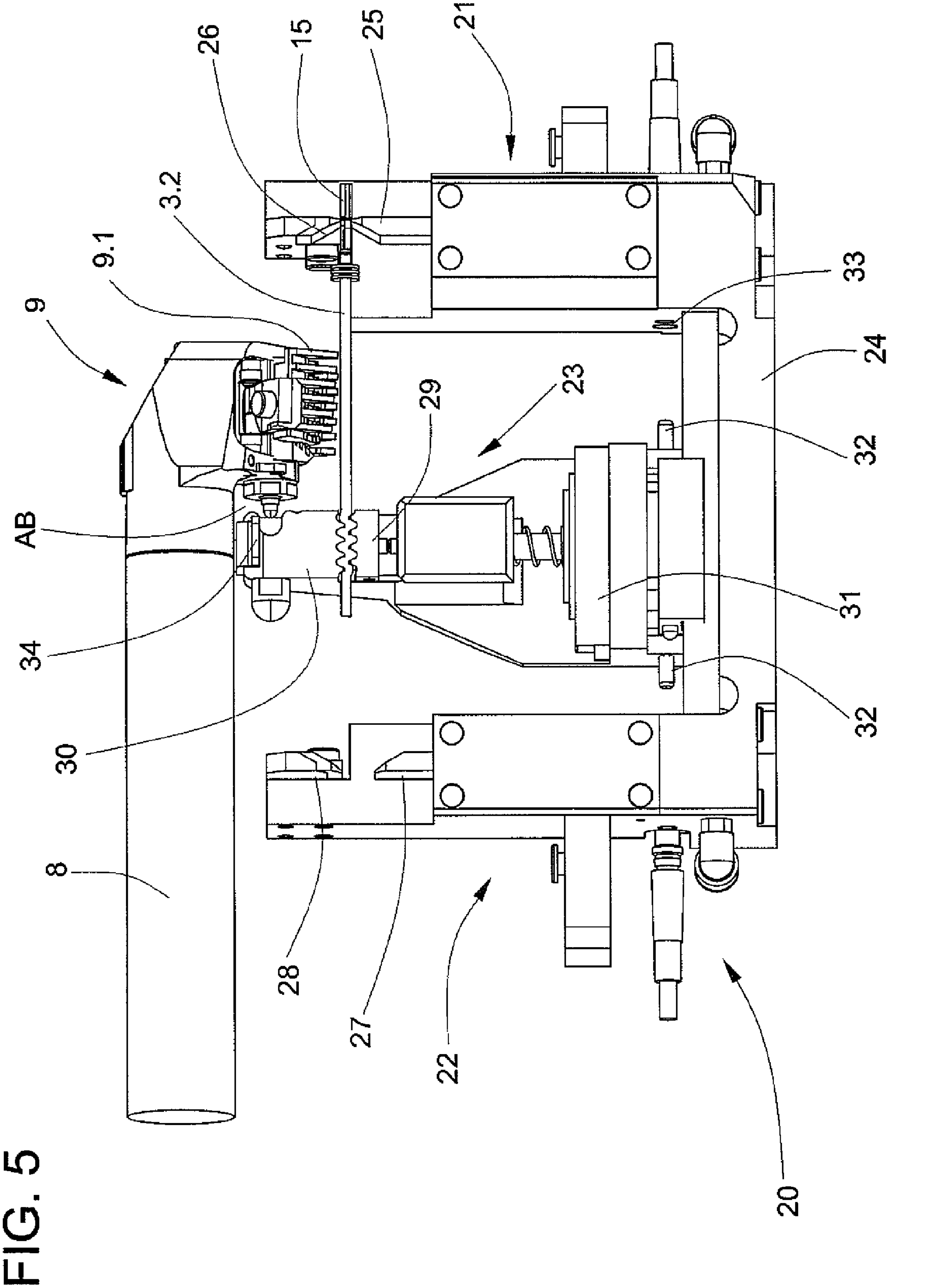

FIG. 5 shows the inserted trailing wire-end 3.2 and the inserted crimped connector 15. The first gripping element 29 of the gripping unit 23 has been fed with the linear movement P8 and, together with the second gripping element 30, firmly grips the trailing wire-end 3.2. The first blade 25 of the first holding unit 21 has been fed with the linear movement P5 and, together with the second blade 26, firmly holds the crimped connector 15. The gripper 9 or gripper jaws 9.1 are then opened. A small gap AB still remains between the gripper 9 and the gripping unit 23.

Figure 6:
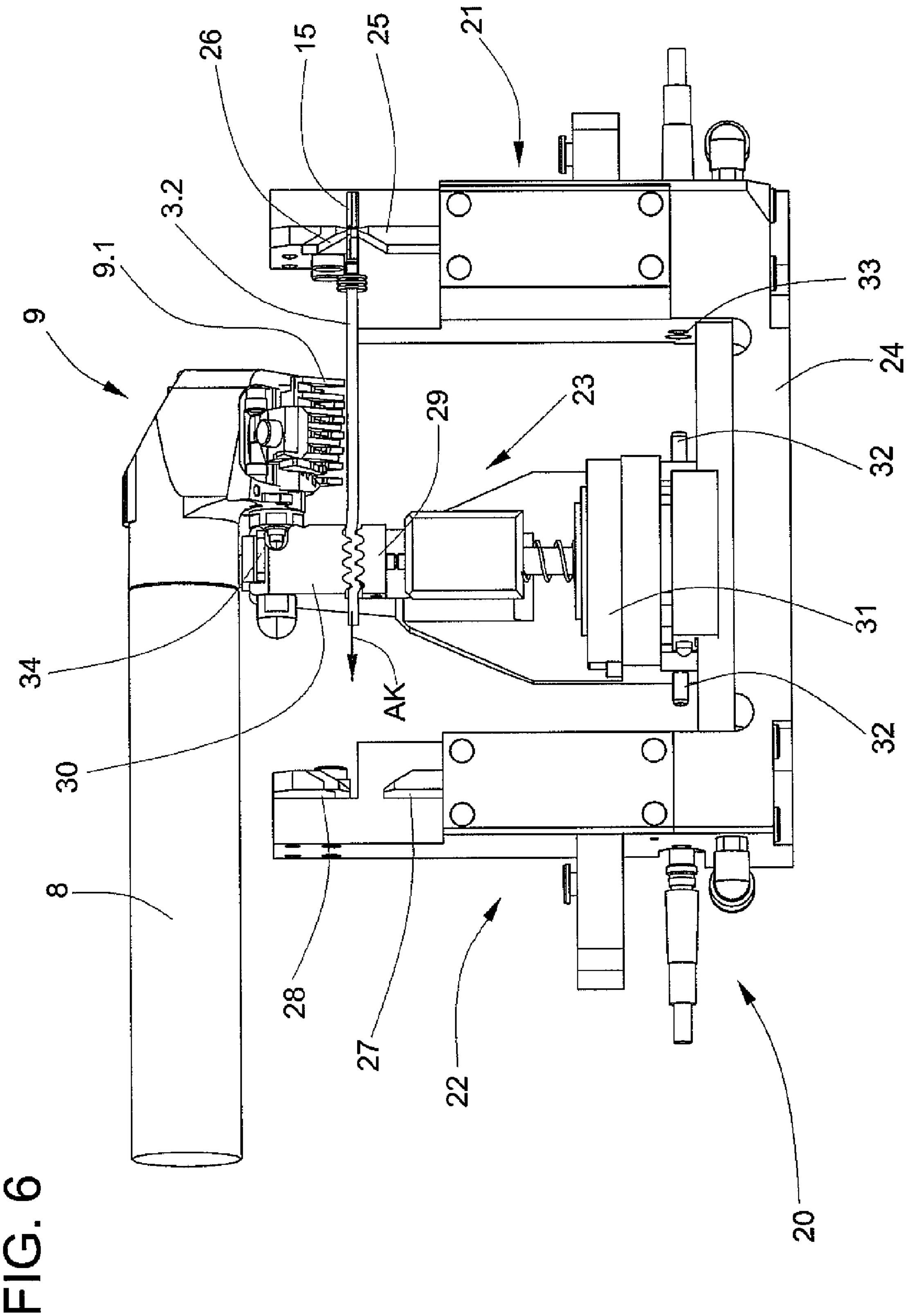
FIG. 6 is a view similar to FIG. 5 showing the pull-out operation.

FIG. 6 shows the pull-out operation. By means of a linear movement away from the first holding unit 21, the gripper 9 applies to the gripping unit 23 the pull-out force AK in the longitudinal axis of the wire. The gripper 9 pushes in the direction of the longitudinal axis of the wire against the gripping unit 23 and, by means of the linear movement P4 away from the crimped connector 15, exerts on the wire 3 the pull-out force AK in the longitudinal axis of the wire. The pull-out force AK that is exerted on the wire 3 is measured by, for example, at least one force sensor that is arranged on the holding unit 21, 22, or by means of the motor current of the motor that causes the linear movement P4.

Figure 7:
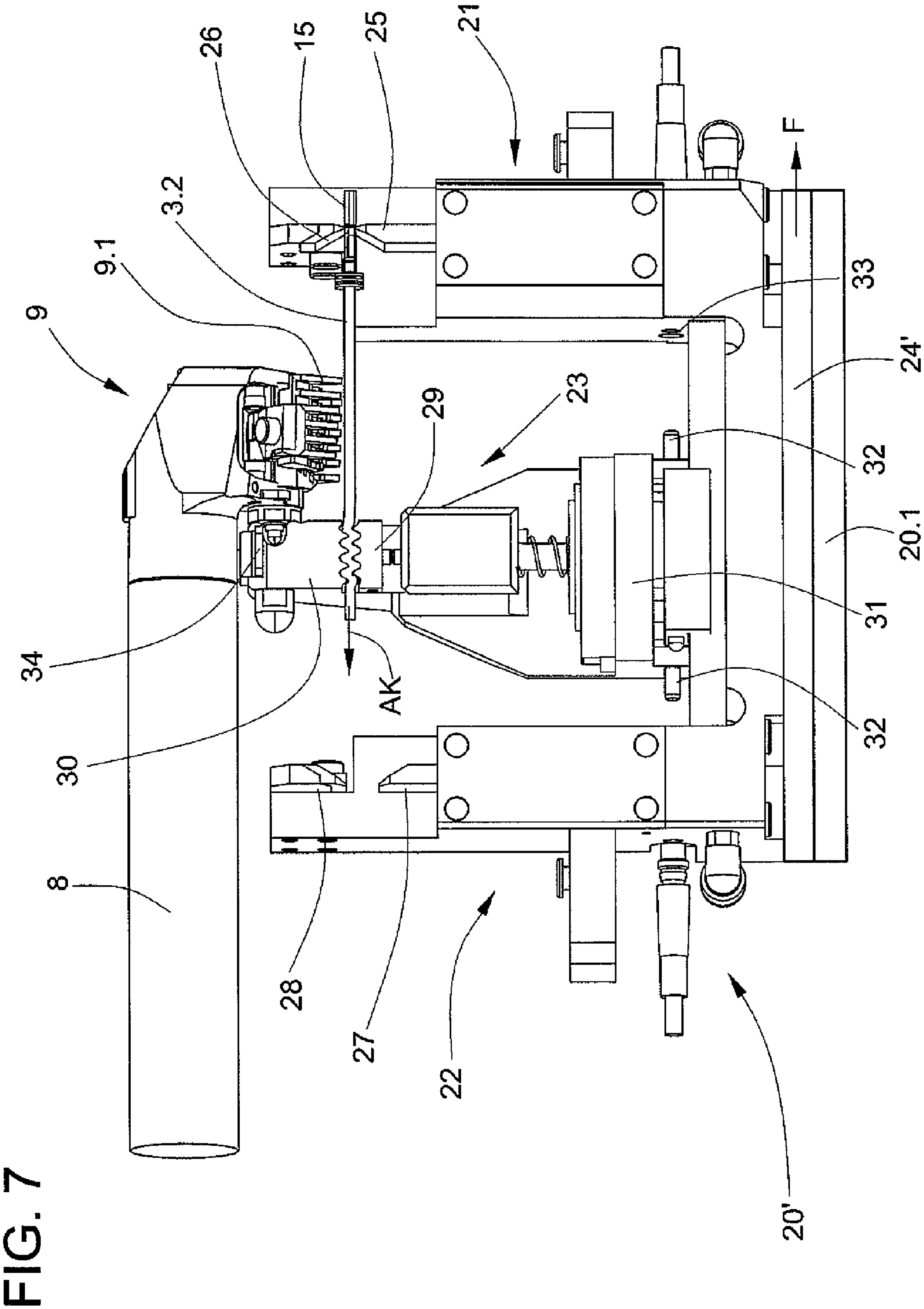
FIG. 7 a view similar to FIG. 6 showing an alternate embodiment of the pull-out device according to the present invention.

Following the pull-out operation, the wire 3 that is no longer usable is picked up again by the gripper 9 and removed. FIG. 7 shows a variant embodiment of the pull-out device 20'. A housing 24' of the pull-out device 20' is arranged on a linear slide 20.1 that can have exerted on it in the direction of the longitudinal axis of the wire a force F (for example, by means of a pneumatic actuator). After inserting the crimped connector 15 into the first holding unit 21, and after inserting the trailing wire-end 3.2 into the gripping unit 23, and after opening the gripper jaws 9.1, the regulator of the drive that causes the linear movement P4 remains switched on and regulates to the stationary position in the position shown, the gripper 9 pushing in the direction of the longitudinal axis of the wire against the gripping unit 23. With the force F exerted on it, the gripper 9 remains in the stationary position and must therefore absorb the reaction force of the force F, which can be determined by measuring the current on the drive that causes the linear movement P4.

Insertion and pull-out inspection of the leading wire-end 3.1 take place in similar manner to insertion, and in similar manner to pull-out inspection, of the trailing wire-end 3.2 with the difference that, on the side of the gripper arm, the crimped connector 15 is inserted into the second holding device 22 and that during the pull-out operation the gripper 9 pushes against the gripping unit 23.

In the case of wires that are provided at the leading and at the trailing wire-end with a crimped connector, the measurement of the pull-out force can be performed time-savingly on the two crimped connectors in sequence. In this way, only one wire is rejected.

The gripping unit 23 can also be equipped with its own drive for the movement in the direction symbolized by means of the arrow P7. In this variant embodiment, the gripper 9 does not create any pull-out force.

The device according to the present invention for measuring pull-out force is not only usable with the swivel-arms described above. The device according to the present invention for measuring pull-out force can, for example, also be used in devices for the linear feeding of wire-ends, as disclosed, for example, in European patent document EP 1 073 163 B1. In addition, other sequences of movements can be provided for feeding the wire that is to be measured to the pull-out device 20.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A wire-processing device having processing stations for processing a wire, at least one gripper feeding the wire to the processing stations for the production of a wire-end connector and being usable for inspection of attachment of the wire-end connector to the wire produced by the processing stations, comprising:

a pull-out device having at least one holding unit for receiving from the at least one gripper and firmly holding the wire-end connector and a gripping unit for receiving from the at least one gripper and firmly gripping the wire to which the wire-end connector is attached, said pull-out device moving one of said at least one holding unit and said gripping unit along a longitudinal axis of the wire while said holding unit is holding the wire-end connector, said gripping unit is gripping the wire and the at least one gripper engages said gripping unit after releasing the wire-end connector and the wire thereby exerting a pull-out force on the attachment of the wire-end connector to the wire along the longitudinal axis of the wire.

2. The wire-processing device according to claim 1 wherein said gripping unit is movable parallel to the longitudinal axis of the wire by the at least one gripper.

3. The wire-processing device according to claim 1 including a housing of said pull-out device being arranged on a linear slide to which a force acting in the direction of the longitudinal axis of the wire can be applied to move said at least one holding unit, the at least one gripper remaining in a stationary position engaged with said gripping unit and absorbing a reaction force generated by the force.

4. The wire-processing device according to claim 1 wherein said gripping unit has a pair of gripping elements for gripping the wire firmly, at least one of said gripping elements being feedable.

5. The wire-processing device according to claim 1 wherein said at least one holding unit has a pair of blades for holding the wire-end connector firmly, at least one of said blades being feedable.

6. A wire-processing device having a pull-out device for inspecting a wire-end connector attached to an end of a wire, the pull-out device comprising:

a holding unit for holding the wire-end connector fed by a gripper; and a gripping unit for gripping the wire fed by the gripper, the wire being attached to the wire-end connector, at least one of said holding unit and said gripping unit being movable along a longitudinal axis of the wire when said holding unit is holding the wire-end connector and said gripping unit is gripping the wire, and when an applied force is exerted to move at least one of said holding unit and said gripping unit in a direction parallel to the longitudinal axis of the wire while the gripper engages said gripping unit after releasing the wire-end connector and the wire, a pull-out force is exerted at the attachment of the wire-end connector to the wire.

7. The wire-processing device according to claim 6 wherein the gripper exerts the applied force to move said gripping unit away from said holding unit.

8. The wire-processing device according to claim 6 including a housing of the pull-out device being arranged on a liner slide to which the applied force is exerted to move said holding unit away from said gripping unit, the gripper being engaged with said gripping unit and absorbing a reaction force generated by the applied force.

9. The wire-processing device according to claim 6 wherein said gripping unit has a pair of gripping elements for gripping the wire firmly, at least one of said gripping elements being movable toward and away from another of said gripping elements.

10. The wire-processing device according to claim 6 wherein said holding unit has a pair of blades for holding the wire-end connector firmly, at least one of said blades being movable toward and away from another of said blades.

11. The wire-processing device according to claim 6 wherein said holding unit is a first holding unit and said pull-out device has a second holding unit for holding another wire-end connector attached to an opposite end of the wire, and when said second holding unit is holding the another wire-end connector and said gripping unit is gripping the wire, the gripper pushes said gripping unit away from said second holding unit in a direction parallel to the longitudinal axis of the wire thereby exerting a pull-out force at the attachment of the another wire-end connector to the wire.

12. A wire-processing device having a pull-out device for inspecting a wire-end connector attached to an end of a wire, comprising:

a housing;

a holding unit fixed on said housing for holding the wire-end connector fed by a gripper; and a gripping unit movable on said housing for gripping the wire fed by the gripper, the wire being attached to the wire-end connector, and when an applied force is exerted to move at least one of said holding unit and said gripping unit in a direction parallel to a longitudinal axis of the wire while said holding unit is holding the wire-end connector, said gripping unit is gripping the wire and the gripper engages said gripping unit after releasing the wire-end connector and the wire, a pull-out force is exerted at the attachment of the wire-end connector to the wire.

* * * * *